US008689030B2

(12) United States Patent
Higuma et al.

(10) Patent No.: US 8,689,030 B2
(45) Date of Patent: Apr. 1, 2014

(54) ELECTRONIC APPARATUS WITH DISPLAY AND DISPLAY CONTROLLER

(75) Inventors: Hideyuki Higuma, Shinagawa (JP);
Akio Nakamura, Shinagawa (JP);
Yutaka Inomoto, Shinagawa (JP);
Yuichiro Terasawa, Shinagawa (JP);
Kazuhiro Yasuno, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 420 days.

(21) Appl. No.: 13/064,440

(22) Filed: Mar. 24, 2011

(65) Prior Publication Data
US 2011/0239028 A1    Sep. 29, 2011

(30) Foreign Application Priority Data

Mar. 26, 2010   (JP) .................................. 2010-071711
Aug. 20, 2010   (JP) .................................. 2010-185641
Feb. 23, 2011   (JP) .................................. 2011-036887

(51) Int. Cl.
*G06F 1/32*    (2006.01)

(52) U.S. Cl.
USPC ............ 713/324; 713/310; 713/320; 713/323

(58) Field of Classification Search
USPC .................................. 713/310, 320, 323, 324
See application file for complete search history.

(56) References Cited

U.S. PATENT DOCUMENTS

| | | | | |
|---|---|---|---|---|
| 6,557,170 B1* | 4/2003 | Wilder et al. | ................. | 725/130 |
| 6,812,920 B1* | 11/2004 | Otsuka | ........................ | 345/211 |
| 7,551,237 B2* | 6/2009 | Numata et al. | ................. | 348/730 |
| RE41,482 E * | 8/2010 | Oh | ................................ | 348/730 |
| 7,971,085 B2* | 6/2011 | Kim | .............................. | 713/324 |
| 2001/0014950 A1 | 8/2001 | Nishikawa | | |
| 2006/0190633 A1* | 8/2006 | Cantwell et al. | ................. | 710/15 |
| 2006/0282693 A1* | 12/2006 | Kim et al. | ..................... | 713/300 |

FOREIGN PATENT DOCUMENTS

JP    2001/222346    8/2001

OTHER PUBLICATIONS

Patent Abstracts of Japan, Publication No. 2001-222346, published Aug. 17, 2001.

* cited by examiner

*Primary Examiner* — Thuan Du
(74) *Attorney, Agent, or Firm* — Staas & Halsey LLP

(57) ABSTRACT

An electronic apparatus includes a display, a display controller that displays an image on the display in accordance with an image signal input from outside, a first power supply unit that coverts an alternating-current power into a first power having a first voltage, and supplies the first power to the display, a shutoff unit that shuts off the alternating-current power being supplied to the first power supply unit, based on the image signal, and a second power supply unit that converts the alternating-current power into a second power having a second voltage, and supplies the second power to the display controller and the shutoff unit.

15 Claims, 17 Drawing Sheets

ELECTRONIC APPARATUS WITH DISPLAY AND DISPLAY CONTROLLER

CROSS REFERENCE TO RELATED APPLICATIONS

The present application is based on Japanese Priority Patent Application No. 2010-071711, filed Mar. 26, 2010, Japanese Patent Application No. 2010-185641, filed Aug. 20, 2010, Japanese Patent Application No. 2011-36887, filed Feb. 23, 2011 the entire contents of which are hereby incorporated by reference.

BACKGROUND OF THE INVENTION

1. Field of the invention

A certain aspect of the present invention is related to an electronic apparatus, and more particularly, to an electronic apparatus that shuts off the power supply to a display.

2. Description of the Related Art

The International Energy Star standard, for example, specifies that a computer or a display automatically enters a sleep mode or a power-off mode after a predetermined period of time since the computer or the display stops being used (see Japanese Laid-Open Patent Publication No. 2001-222346, for example).

However, the transition to a sleep mode or a power-off mode involves complicated procedures. This electronic apparatus aims to reduce power consumptions in a simple manner.

SUMMARY OF THE INVENTION

According to an aspect of the present invention, there is provided an electronic apparatus including: a display; a display controller that displays an image on the display in accordance with an image signal input from outside; a first power supply unit that coverts an alternating-current power into a first power having a first voltage, and supplies the first power to the display; a shutoff unit that shuts off the alternating-current power being supplied to the first power supply unit, based on the image signal; and a second power supply unit that converts the alternating-current power into a second power having a second voltage, and supplies the second power to the display controller and the shutoff unit.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

The following is a description of embodiments, with reference to the accompanying drawings.

[First Embodiment]

Figure 1:
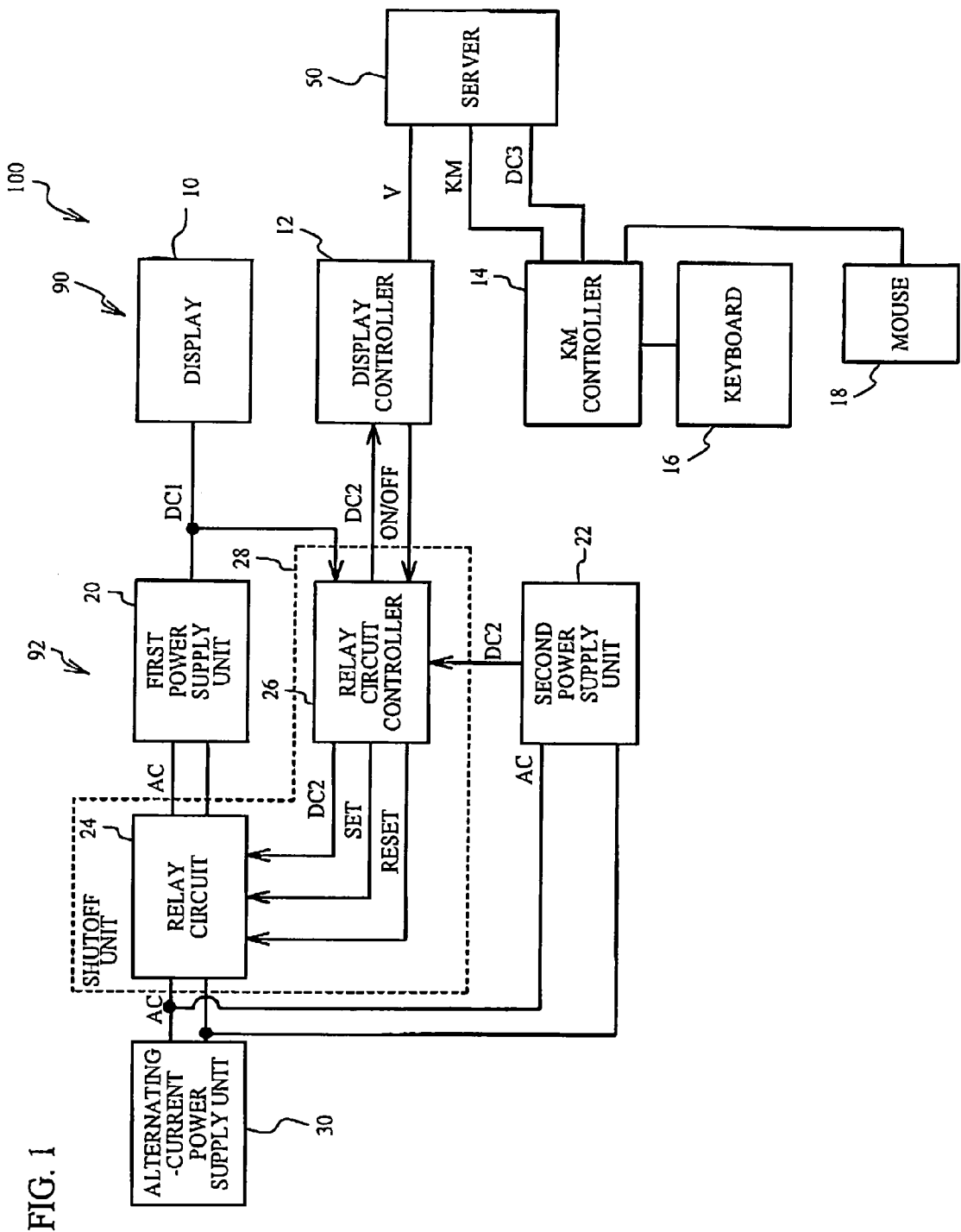
FIG. 1 is a block diagram of an electronic apparatus according to a first embodiment.

A first embodiment concerns an example of a drawer compliant with the International Energy Star standard. FIG. 1 is a block diagram of an electronic apparatus according to the first embodiment. The electronic apparatus 100 includes a main unit 90 and a power supply unit 92. The main unit 90 includes a display 10, a display controller 12, a keyboard 16, a mouse 18, and a KM controller 14. The display controller 12 controls the display 10. For example, the display controller 12 controls images to be displayed on the display 10, based on an image signal V from an external device such as a server 50. If the display controller 12 is unable to receive the image signal V for a predetermined period of time, the display controller 12 sets an ON/OFF signal at OFF. The KM controller 14 outputs signals from the keyboard 16 and the mouse 18 as a keyboard signal K and a mouse signal M to the server 50. The electronic apparatus 100 is a drawer, for example, and is housed in a rack. When the drawer is pulled out, the server 50 connected to the electronic apparatus 100 can be operated by using the display 10, the keyboard 16, and the mouse 18. The display 10 is a liquid crystal display, for example. The mouse 18 may be replaced with a pointing device, or may be replaced with a touch panel, for example.

The power supply unit 92 includes a first power supply unit 20, a second power supply unit 22, and a shutoff unit 28. The first power supply unit 20 converts an alternating-current power AC supplied from an alternating-current power supply unit 30 into a first power DC1 (a direct current, for example) having a first voltage, and supplies the first power DC1 to the display 10. The first voltage is 12 V, for example. If the first power DC1 is a direct current, the first power DC1 is converted into an alternating current by an inverter in the display 10. The converted alternating-current power is supplied to the fluorescent tube of the backlight. If the backlight is formed with a LED (Light Emitting Device), for example, the direct-current first power DC1 may be supplied to the backlight. The second power supply unit 22 converts the alternating-current power AC supplied from the alternating-current power supply unit 30 into a second power DC2 (a direct current, for example) having a second voltage, and supplies the second power DC2 to the shutoff unit 28. The shutoff unit 28 includes a relay circuit 24 and a relay circuit controller 26. Based on the ON/OFF signal supplied from the display controller 12, the shutoff unit 28 shuts off the alternating-current power being supplied to the first power supply unit 20. The second power supply unit 22 supplies the second power DC2 to the relay circuit controller 26. The relay circuit controller 26 supplies the second power DC2 to the display controller 12 and the relay circuit 24. The relay circuit controller 26 may supply the second power DC2 to the KM controller 14. Alternatively, the second power supply unit 22 may supply the second power DC2 to the display controller 12, without intervention of the relay circuit controller 26. Based on the ON/OFF signal, the relay circuit controller 26 outputs a set signal SET and a reset signal RESET to the relay circuit 24. The ON/OFF signal may be used not only for controlling the relay circuit 24 but also for switching on and off the indicator lamp that indicates the existence of the image signal V.

Figure 2:
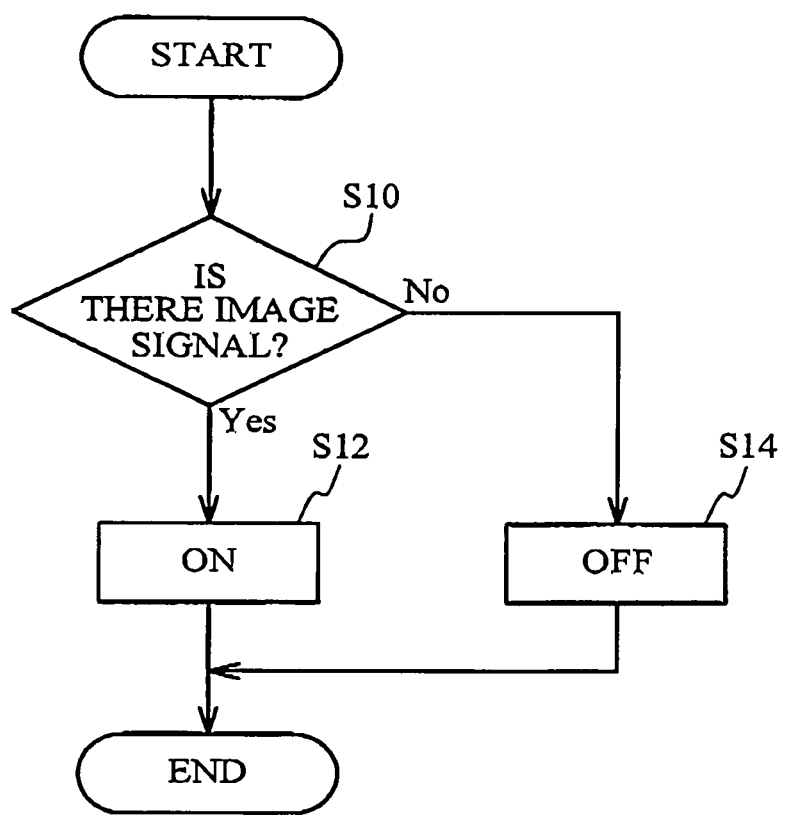
FIG. 2 is a flowchart showing an operation of the display controller.

FIG. 2 is a flowchart showing an operation of the display controller 12. The display controller 12 determines whether the image signal V from the server 50 has been received over a predetermined period of time (step S10). If the determination result is "Yes", the display controller 12 sets the ON/OFF signal at ON (step S12). For example, when the power switch of the main unit 90 is on, the display controller 12 sets the ON/OFF signal at ON. If the determination result is "No", the display controller 12 sets the ON/OFF signal at OFF (step S14). For example, when the power switch of the main unit 90 is pressed, and the electronic apparatus 100 is in a power-off mode, a standby mode, or a sleep mode, the display controller 12 sets the ON/OFF signal at OFF.

Next, an operation of the relay circuit controller 26 is described. The relay circuit 24 is a latch circuit, for example. When the relay circuit controller 26 transmits the set signal SET to the relay circuit 24, the relay circuit 24 maintains a state in which the alternating-current power AC is supplied to the first power supply unit 20. When the relay circuit controller 26 transmits the reset signal RESET to the relay circuit 24, the relay circuit 24 maintains a state in which the alternating-current power AC to be supplied to the first power supply unit 20 is shut off.

Figure 3A:
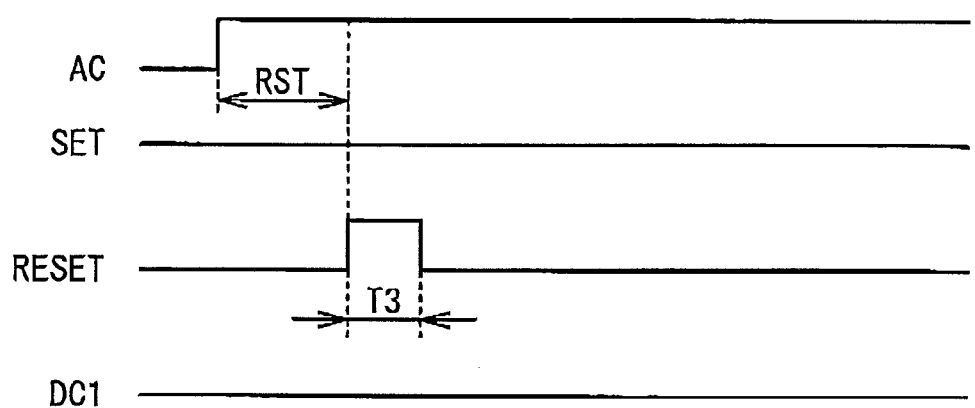
FIGS. 3A and 3B are timing charts of respective signals.
Figure 3B:
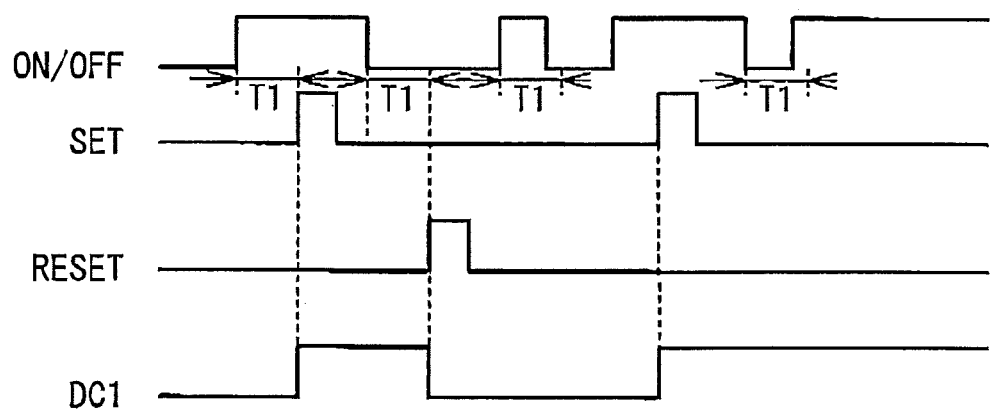

FIGS. 3A and 3B are timing charts of the respective signals. FIG. 3A is a timing chart of the alternating-current power AC, the set signal SET, the reset signal RESET, and the first power DC1 observed when a power is supplied. As shown in FIG. 3A, while the alternating-current power AC is off, the set signal SET and the reset signal RESET are off. The first power DC1 is 0 V. When the alternating-current power AC is supplied, the second power supply unit 22 supplies the second power DC2 to the relay circuit controller 26. After a period of time RST since the application of the alternating-current power AC, the relay circuit controller 26 transmits the reset signal RESET to the relay circuit 24 (the reset signal is set at the high level, for example). The reset signal RESET remains at the high level during a period of time T3 (20 milliseconds, for example). The relay circuit 24 then shuts off the alternating-current power AC to be supplied to the first power supply unit 20. Therefore, the first power DC1 is not supplied to the display 10.

Figure 4:
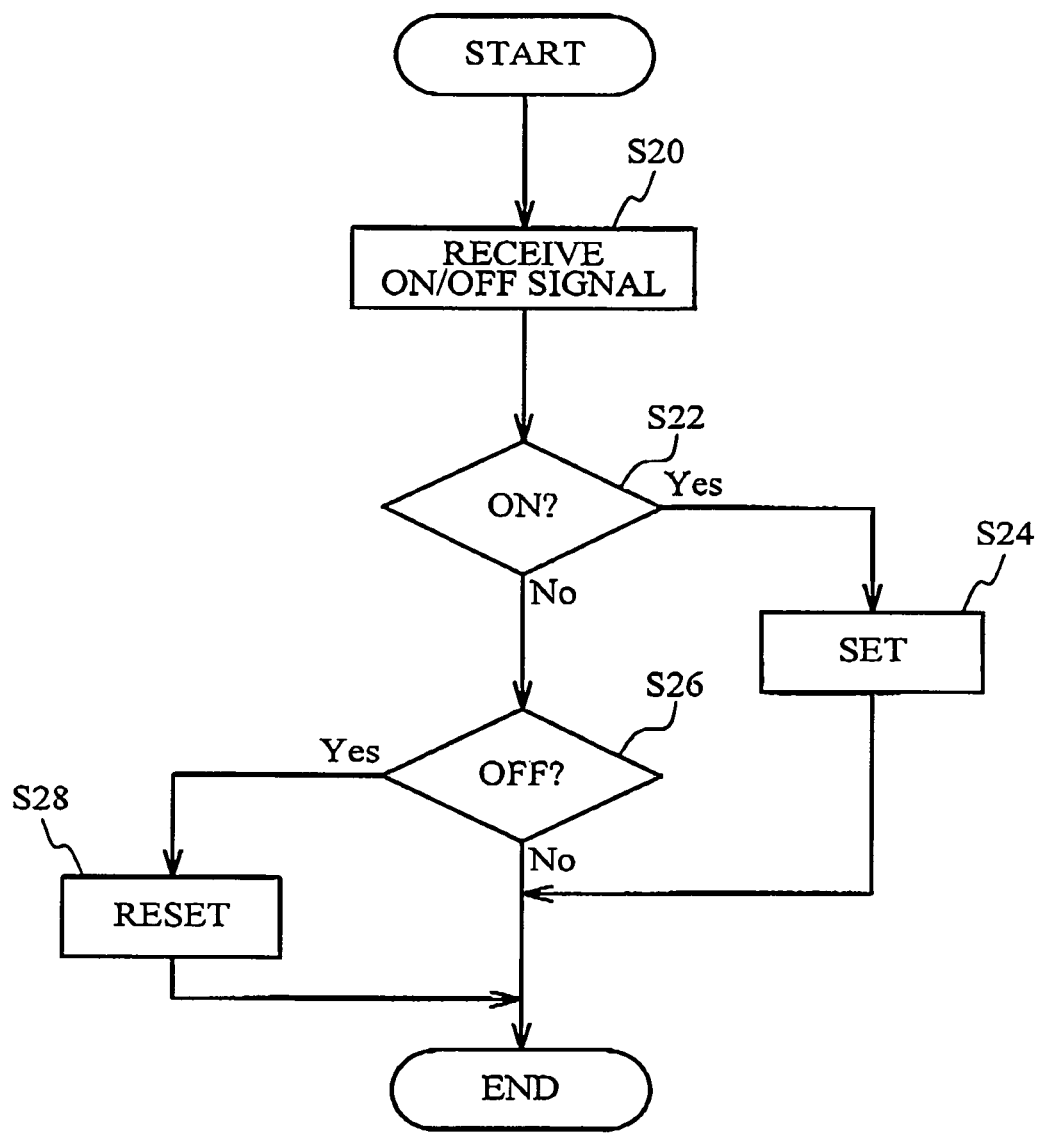
FIG. 4 is a flowchart showing an operation of the relay circuit controller.

FIG. 3B is a timing chart of the ON/OFF signal, the set signal SET, the reset signal RESET, and the first power DC1 in a fundamental operation of the relay circuit controller 26. FIG. 4 is a flowchart showing an operation of the relay circuit controller 26. As shown in FIG. 4, the relay circuit controller 26 receives the ON/OFF signal (step S20). The relay circuit controller 26 then determines whether the ON/OFF signal has been ON over a predetermined period of time (step S22). If the determination result is "Yes", the relay circuit controller 26 transmits the set signal SET to the relay circuit 24 (step S24). After that, the operation comes to an end, and returns to step S20. If the determination result of step S22 is "No", the relay circuit controller 26 determines whether the ON/OFF signal has been OFF over a predetermined period of time (step S26). If the determination result is "Yes", the relay circuit controller 26 transmits the reset signal RESET to the relay circuit 24 (step S28). After that, the operation comes to an end, and returns to step S20. If the determination result of step S26 is "No", the operation comes to an end, and returns to step S20.

As shown in FIG. 3B, after a period of time T1 (100 milliseconds, for example) since the ON/OFF signal is set at ON, the relay circuit controller 26 transmits the set signal SET (for example, the set signal is set at the high level during a period of time T3). With this arrangement, the first power DC1 is supplied to the display 10. After the period of time T1 (100 milliseconds, for example) since the ON/OFF signal is set at OFF, the relay circuit controller 26 transmits the reset signal RESET (for example, the reset signal is set at the high level during the period of time T3). With this arrangement, the first power DC1 is not supplied to the display 10. If the ON/OFF signal is set at OFF within the period of time T1 since the ON/OFF signal is set at ON, the relay circuit controller 26 does not transmit the set signal SET. If the ON/OFF signal is set at ON within the period of time T1 since the ON/OFF signal is set at OFF, the relay circuit controller 26 does not transmit the reset signal RESET. With this arrangement, malfunctions can be restrained when the ON/OFF signal is momentarily set at ON or OFF due to noise or the like.

Figure 5B:
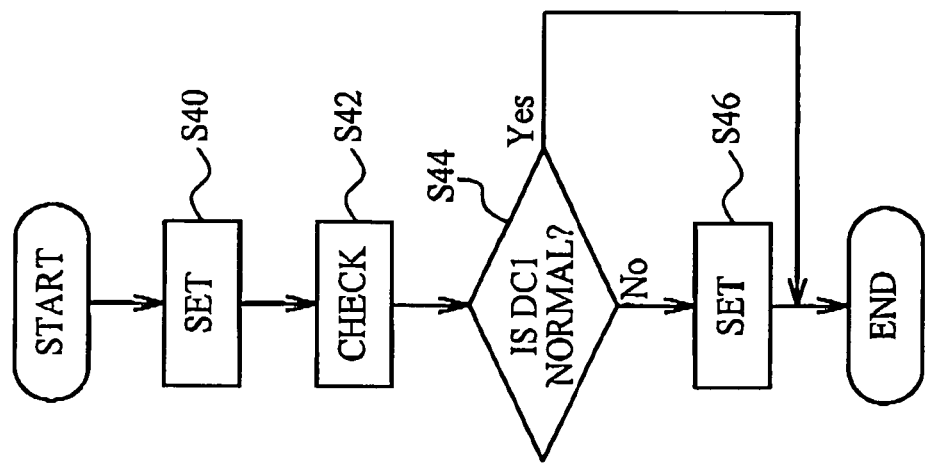
FIG. 5B is a timing chart of respective signals.
Figure 5A:
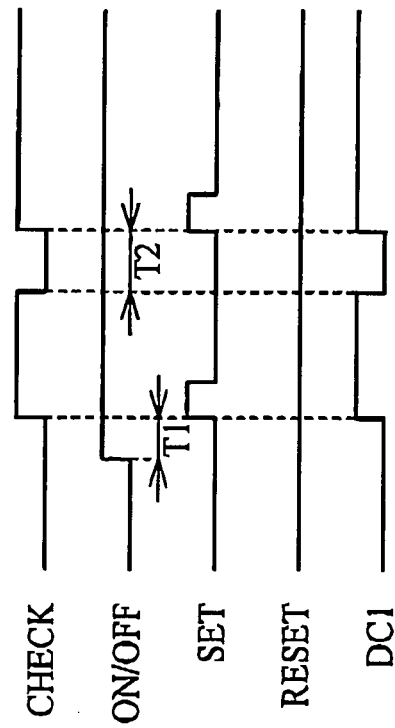
FIG. 5A is a flowchart showing an operation of the relay circuit controller.

The relay circuit 24 might malfunction due to vibrations and the like. An operation to be performed when the relay circuit 24 malfunctions is now described. FIG. 5A is a flowchart showing an operation of the relay circuit controller 26. FIG. 5B is a timing chart of the respective signals. As shown in FIG. 5A, the relay circuit controller 26 transmits the set signal SET to the relay circuit 24 (step S40). The relay circuit controller 26 checks the output voltage of the first power supply unit 20 (step S42). The relay circuit controller 26 determines whether the first power DC1 of the first power supply unit 20 is normal (step S44). For example, if the first power DC1 of the first power supply unit 20 has been decreasing over a predetermined period of time, the relay circuit controller 26 determines that the first power DC1 is not normal. If the determination result of step S44 is "No", the relay circuit controller 26 transmits the set signal SET to the relay circuit 24 (step S46). The operation then comes to an end, and returns to step S42. If the determination result of step S44 is "Yes", the operation comes to an end, and returns to step S42.

FIG. 5B is a timing chart of a check signal CHECK, the ON/OFF signal, the set signal SET, the reset signal RESET, and the first power DC1. As shown in FIG. 5B, after the period of time T1 since the ON/OFF signal is set at ON, the set signal SET is at the high level for a predetermined period of time. The first power supply unit 20 supplies the first power DC1 to the display 10. When the first power DC1 decreases for some reason (such as vibrations or the like), the check signal CHECK switches to the low level (indicating that the first power DC1 has become lower, for example). After a predetermined period of time T2 (20 milliseconds, for example), the set signal SET is at the high level for a predetermined period of time. The relay circuit 24 then connects the alternating-current power AC to the first power supply unit 20. The first power supply unit 20 supplies the first power DC1 to the display 10.

Figure 6A:
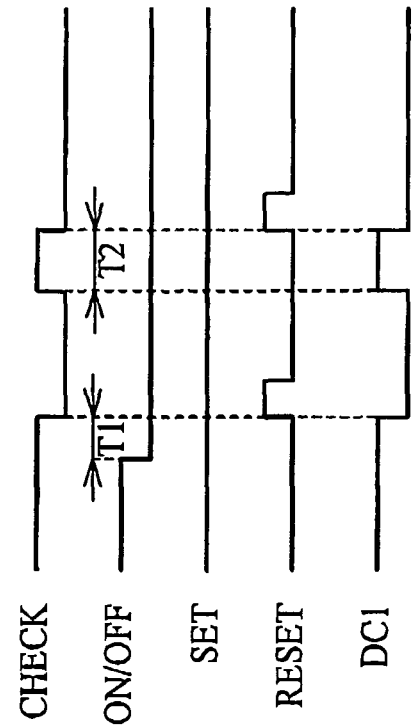
FIG. 6A is a flowchart showing an operation of the relay circuit controller.
Figure 6B:
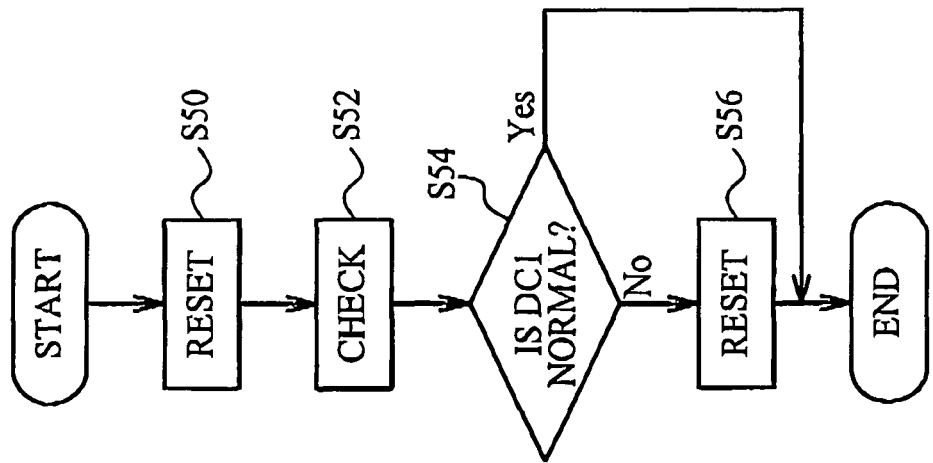
FIG. 6B is a timing chart of the respective signals.

FIG. 6A is a flowchart showing another operation of the relay circuit controller 26. FIG. 6B is a timing chart of the respective signals. As shown in FIG. 6A, the relay circuit controller 26 transmits the reset signal RESET to the relay circuit 24 (step S50). The relay circuit controller 26 checks the output power of the first power supply unit 20 (step S52). The relay circuit controller 26 determines whether the first power DC1 of the first power supply unit 20 is normal (step S54). For example, if the first power supply unit 20 has been supplying power over a predetermined period of time, the relay circuit controller 26 determines that the first power DC1 is not normal. If the determination result of step S54 is "No", the relay circuit controller 26 transmits the reset signal RESET to the relay circuit 24 (step S56). After that, the operation comes to an end, and returns to step S52. If the determination result of step S54 is "Yes", the operation comes to an end, and returns to step S52.

FIG. 6B is a timing chart of the check signal CHECK, the ON/OFF signal, the set signal SET, the reset signal RESET, and the first power DC1. As shown in FIG. 6B, after the period of time T1 since the ON/OFF signal is set at ON, the reset signal RESET is at the high level for a predetermined period of time. The first power supply unit 20 does not supply the first power DC1 to the display 10. When the first power DC1 is supplied for some reason (such as vibrations or the like), the check signal CHECK switches to the high level (indicating that the first power DC1 is being supplied, for example). After the predetermined period of time T2 (20 milliseconds, for example), the reset signal RESET is at the high level for a predetermined period of time. The relay circuit 24 then shuts off the supply of the alternating-current power AC to the first power supply unit 20.

As described above, the relay circuit controller 26 monitors the output of the first power supply unit 20. If the first power supply unit 20 stops outputting the first power DC1 though the set signal SET has been transmitted to the relay circuit 24, the relay circuit controller 26 transmits the set signal SET to the relay circuit 24. If the first power supply unit 20 outputs the first power DC1 though the reset signal RESET has been transmitted to the relay circuit 24, the relay circuit controller 26 transmits the reset signal RESET to the relay circuit 24. Accordingly, even if the relay circuit 24 malfunctions, the relay circuit 24 can return to a normal operation.

Figure 7A:
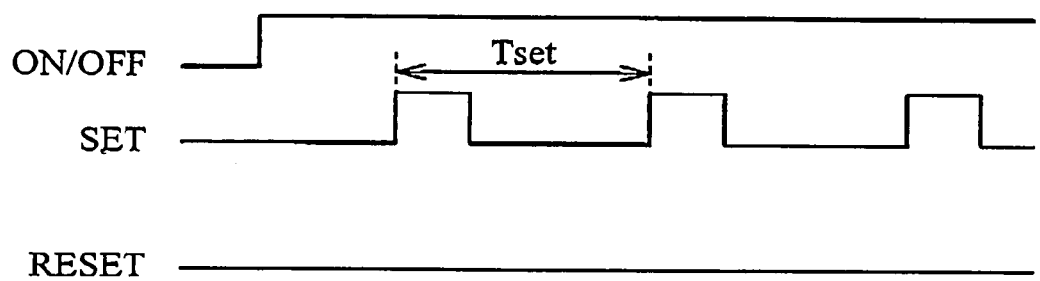
FIGS. 7A and 7B are timing charts of respective signals.
Figure 7B:
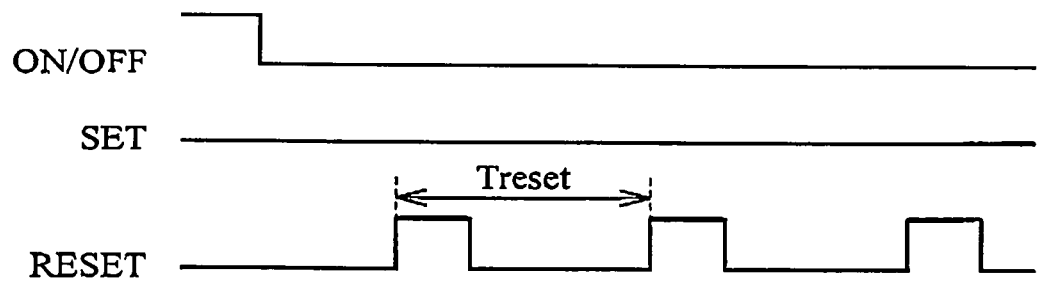

Next, another example of operations to be performed when the relay circuit 24 malfunctions is described. FIGS. 7A and 7B are timing charts of the respective signals. As shown in FIG. 7A, the ON/OFF signal is set at ON. The relay circuit controller 26 transmits the set signal SET to the relay circuit 24 at regular intervals Tset. As shown in FIG. 7B, the ON/OFF signal is set at OFF. The relay circuit controller 26 transmits the reset signal RESET to the relay circuit 24 at regular intervals Treset. For example, each interval Tset may be 10 seconds, and each interval Treset may be 30 minutes. Alternatively, each interval Tset may be 3 seconds, and each interval Treset may be 1 minute. Further, an interval Tset of 5 seconds and an interval Treset of 1 minute may be repeated five times, and, after that, each interval Treset can be set at one hour. As described above, the intervals Tset and the intervals Treset can be arbitrarily changed. With the use of the display 10 being taken into account, the intervals Tset are preferably shorter than the intervals Treset.

As described above, when transmitting the set signal SET to the relay circuit 24, the relay circuit controller 26 can transmit the set signal SET either regularly or irregularly. When transmitting the reset signal RESET to the relay circuit 24, the relay circuit controller 26 can transmit the reset signal RESET either regularly or irregularly. Accordingly, degradation of the usage environment due to malfunctions of the relay circuit 24 can be restrained.

The first embodiment includes the first power supply unit 20 that converts the alternating-current power AC into the first power DC1 having the first voltage and supplies the first power DC1 to the display 10, and the second power supply unit 22 that converts the alternating-current power AC into the second power DC2 having the second voltage and supplies the second power DC2 to the display controller 12 and the shutoff unit 28. Based on the image state, the shutoff unit 28 shuts off the alternating-current power AC being supplied to the first power supply unit 20. Accordingly, the power consumption of the display 10 can be readily reduced. Further, by shutting off the alternating-current power AC being supplied to the first power supply unit 20 that converts voltages, the power consumption can be further reduced. The power consumption of the display 10 is larger than the power consumption of the other components of the electronic apparatus 100. The voltage of the second power DC2 supplied to the display 10 is higher than the voltage of the first power DC1. Accordingly, reducing the power consumption of the display 10 by shutting off the alternating-current power AC being supplied to the first power supply unit 20 is effective in reducing the power consumption of the electronic apparatus 100.

Also, when the display controller 12 is unable to receive an image signal of an image to be displayed on the display 10, the shutoff unit 28 shuts off the alternating-current AC being supplied to the first power supply unit 20. Accordingly, when the image signal V does not exist, the first power DC1 being supplied to the display 10 can be shut off.

[Second Embodiment]

Figure 8:
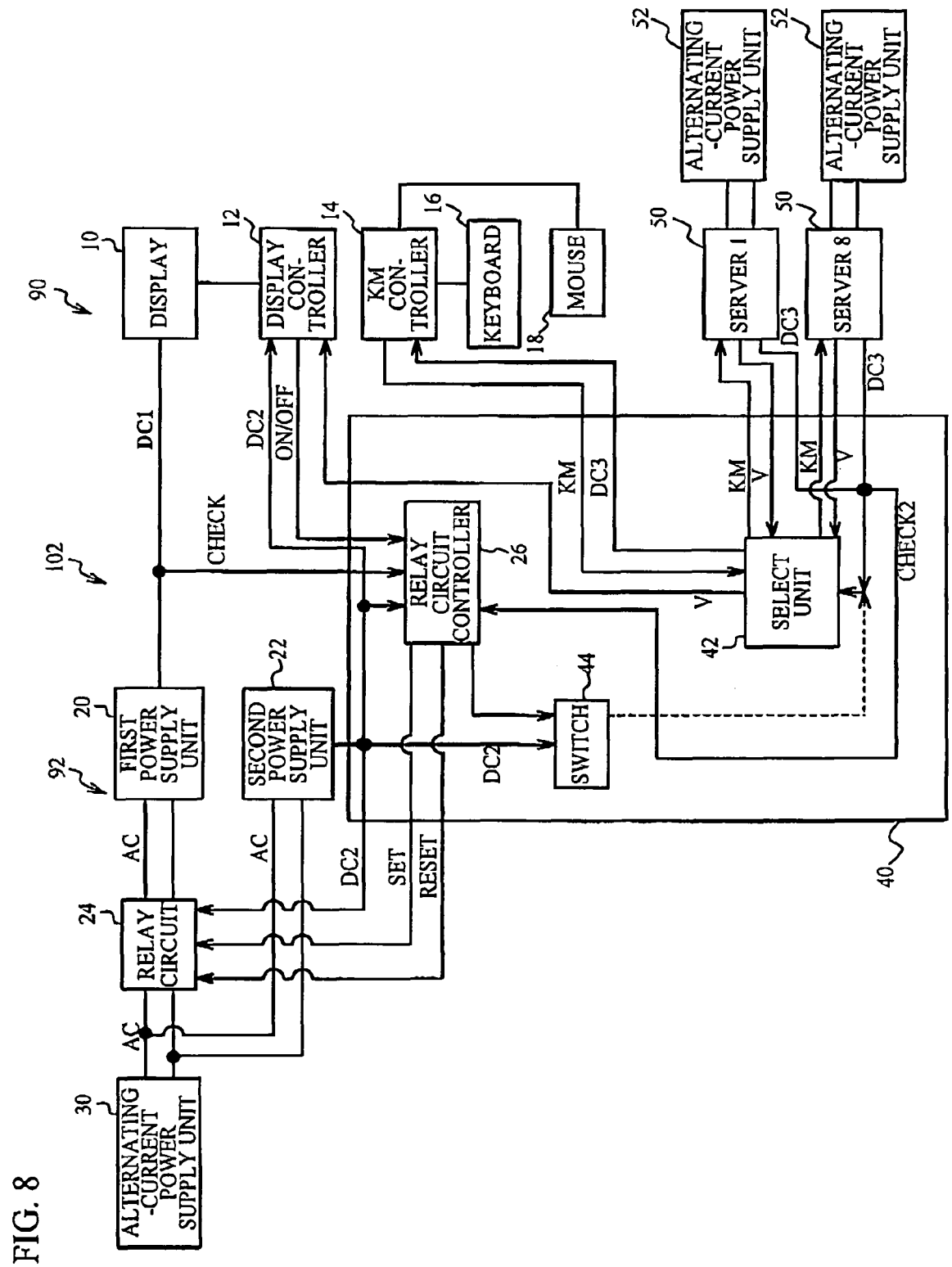
FIG. 8 is a block diagram of an electronic apparatus according to a second embodiment.

A second embodiment concerns an example in which an electronic apparatus includes a KVM switch. FIG. 8 is a block diagram of the electronic apparatus according to the second embodiment. As shown in FIG. 8, the electronic apparatus 102 according to the second embodiment includes a KVM switch 40, as well as the main unit 90 and the power supply unit 92. The KVM switch 40 includes a select unit 42, a switch 44, and the relay circuit controller 26. The relay circuit controller 26 is shared between the power supply unit 92 and the KVM switch 40. Servers 50 are connected to the select unit 42. An alternating-current power AC is supplied from each alternating-current power supply unit 52 to each corresponding server 50. The select unit 42 selects one of the servers 50, and transmits the image signal V output from the selected server 50 to the display controller 12. For example, the select unit 42 outputs the same signal as the image signal V output from the selected server 50, to the display controller 12. Also, input signals K and M (a keyboard signal and a mouse signal, for example) received from the KM controller 14 are transmitted to the selected server 50. For example, the select unit 42 outputs the same signals as the input signals output from the KM controller 14, to the selected server 50.

Further, the servers 50 each convert the voltage of the alternating-current power AC, and supply a third power DC3 (a direct-current power, for example) to the KVM switch 40. For example, the servers 50 supply the third power DC3 (5 V, for example) to the select unit 42. Accordingly, the power consumption of the electronic apparatus 102 can be reduced. The relay circuit controller 26 monitors the third power DC3 supplied from the servers 50, using a check signal CHECK2. If the third power DC3 supplied from the servers 50 is unstable, the relay circuit controller 26 turns on the switch 44, and supplies the second power DC2 from the second power supply unit 22 to the select unit 42. The other aspects of the structure of this embodiment are the same as those of the first embodiment, and therefore, explanation of them is not repeated herein.

Figure 9:
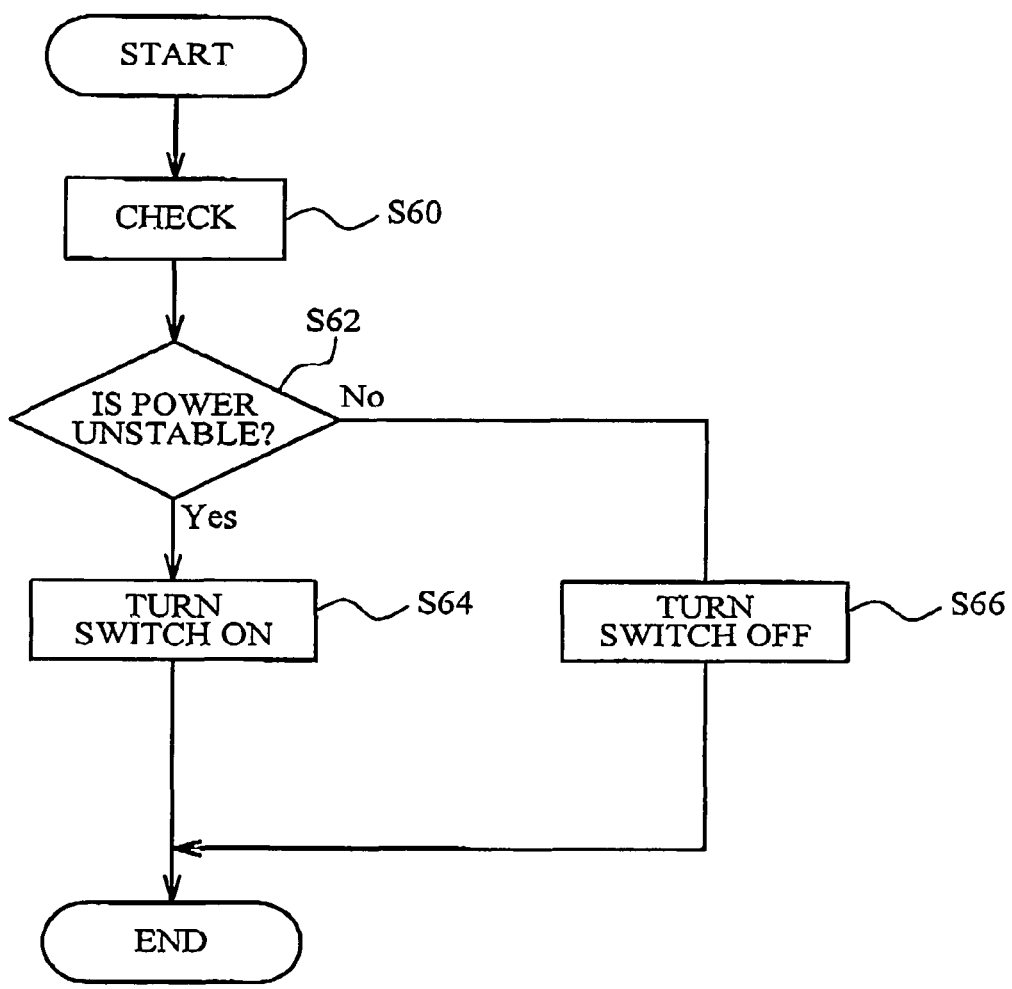
FIG. 9 is a flowchart showing an operation of the relay circuit controller.

FIG. 9 is a flowchart showing an operation of the relay circuit controller 26. As shown in FIG. 9, the relay circuit controller 26 monitors the third power DC3 supplied from the servers 50 (step S60). The relay circuit controller 26 determines whether the third power DC3 is unstable (step S62). For example, if the voltage of the power deviates from a standard value, the relay circuit controller 26 determines that the third power DC3 has become unstable. If the determination result of step S62 is "Yes", the relay circuit controller 26 turns on the switch 44 (step S64). If the determination result of step S62 is "No", the relay circuit controller 26 turns off the switch 44 (step S66).

As in the second embodiment, the electronic apparatus 102 can include the KVM switch 40. Further, at least one of the servers 50 connected to the KVM switch 40 supplies the third power DC3 to the select unit 42. If the third power DC3 supplied from the servers 50 becomes unstable, the second power supply unit 22 supplies the second power DC2 to the select unit 42. Accordingly, even if the power supplied from the servers 50 becomes unstable, the KVM switch 40 can function properly.

In a case where an image signal for displaying an image on the display 10 of an electronic apparatus is received from outside as in the first embodiment and the second embodiment, or in a case where a server is located outside, it is not easy to reduce the power consumption of the display 10 in the electronic apparatus 100. To counter this problem, the power to be supplied to the display 10 is shut off, depending on the state (or the existence) of an image signal. In this manner, the power consumption of an electronic apparatus can be readily reduced, and an electronic apparatus compliant with the International Energy Start standard, for example, can be provided.

[Third Embodiment]

Figure 10:
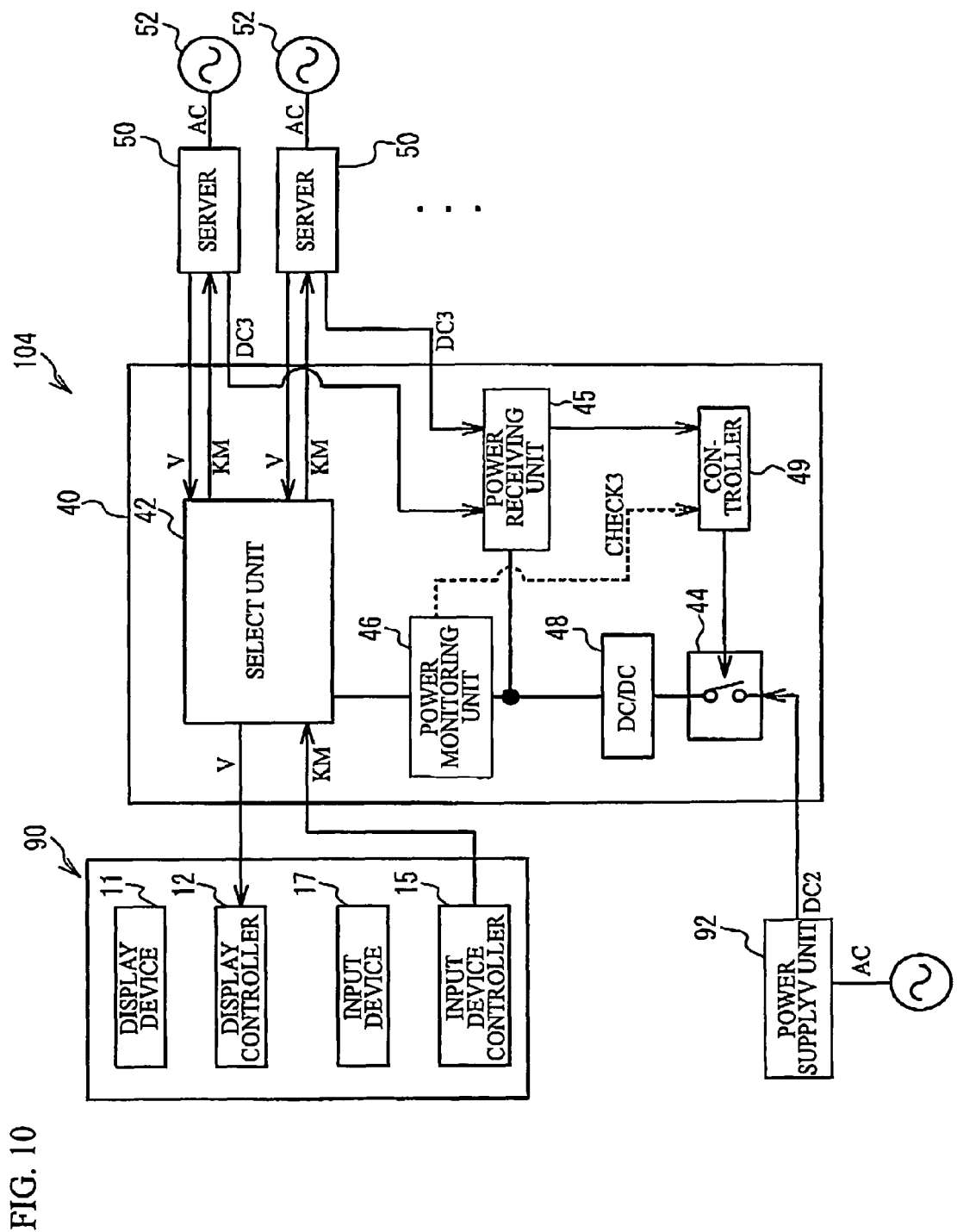
FIG. 10 is a block diagram of an electronic apparatus according to a third embodiment.

FIG. 10 is a block diagram of an electronic apparatus according to a third embodiment. As shown in FIG. 10, the electronic apparatus 104 includes the main unit 90, the KVM switch 40, and the power supply unit 92. The electronic apparatus 104 is a drawer, for example, and is housed in a rack. When the drawer is pulled out, the servers 50 connected to the electronic apparatus 104 can be operated by using a display device 11 and an input device 17. The main unit 90 includes the display device 11, the display controller 12, the input device 17, and an input device controller 15. The display controller 12 controls the display device 11. For example, the image to be displayed on the display device 11 is controlled, based on the image signal V supplied from an external device such as a server 50. The input device controller 15 outputs signals supplied from the input device 17 as the input signals K and M to the servers 50. Commands from the servers 50 are input to the input device 17. The input device 17 may be a keyboard and a mouse, for example. The mouse may be replaced with a pointing device such as a touch panel.

The KVM switch 40 includes the select unit 42, the switch 44, a power receiving unit 45, a power monitoring unit 46, a DC-DC converter 48, and a controller 49. The servers 50 are connected to the select unit 42. The select unit 42 selects one of the servers 50, and transmits the image signal V received from the selected server 50 to the display controller 12. For example, the select unit 42 transmits the same signal as the image signal V received from the selected server 50 to the display controller 12. The select unit 42 also transmits the input signals K and M (a keyboard signal and a mouse signal, for example) received from the input device controller 15, to the selected server 50. For example, the select unit 42 transmits the same signals as the input signals received from the input device controller 15, to the selected server 50. Further, the select unit 42 transmits input device commands received from the selected server 50, to the input device controller 15.

The servers 50 each convert the voltage of the alternating-current AC supplied from alternating-current power supply units 52 into the third power DC3 (a direct-current power, for example), and supplies the third power DC3 to the KVM switch 40. The power receiving unit 45 receives the third power DC3 (5 V, for example) from at least one of the servers 50. The power receiving unit 45 supplies the third power DC3 as a received power to the select unit 42. The power supply unit 92 converts the voltage of the alternating-current power of the alternating-current power supply unit 30 into the second power DC2 (a direct current, 12 V, for example). The switch 44 connects or shuts off the second power DC2 (the converted power) to the select 42. The DC-DC converter 48 converts the second power DC2 into a desired voltage. For example, the DC-DC converter 48 converts 12 V into 5 V. Alternatively, the DC-DC converter 48 may not be provided, and the voltage supplied from the power supply unit 92 may not be converted, and may be supplied as it is to the select unit 42. For example, the voltage supplied from the power supply unit 92 may be 5 V.

The power monitoring unit 46 monitors the state of power being supplied to the select unit 42. For example, the power monitoring unit 46 monitors the voltage of the power being supplied to the select unit 42. The power monitoring unit 46 transmits the monitor result as a check signal CHECK3 to the controller 49. The controller 49 receives the state of the third power DC3 from the power receiving unit 45, and also receives the check signal CHECK3 from the power monitoring unit 46. Based on the state of the third power DC3 or the check signal CHECK3, the controller 49 turns on or off the switch 44. That is, the controller 49 selects either the second power DC2 (the converted power) or the third power DC3 (the received power), and supplies the selected power to the select unit 42.

Figure 11:
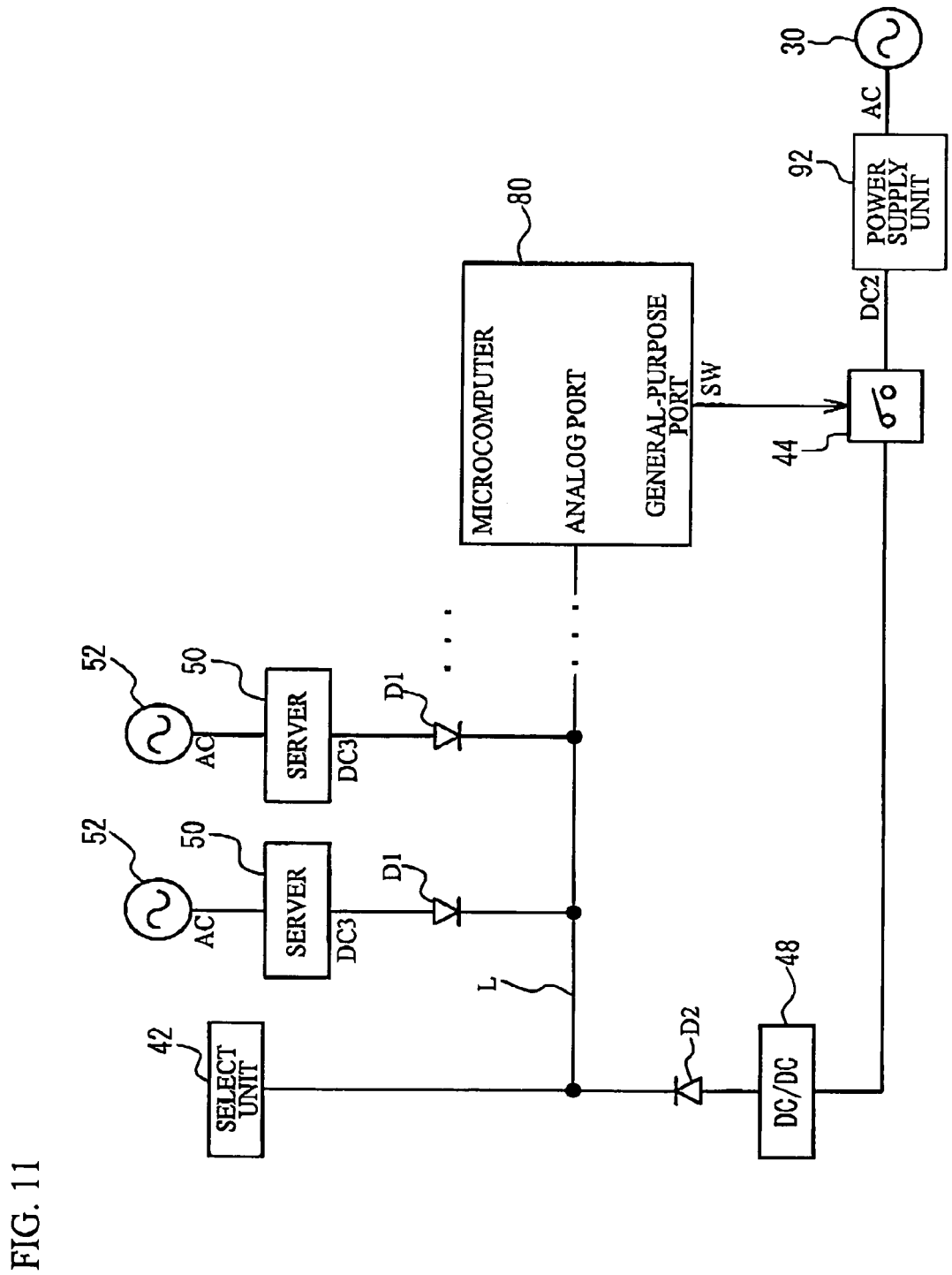
FIG. 11 is a block diagram showing an example of the system of the power supply to the select unit in the electronic apparatus according to the third embodiment.

FIG. 11 is a block diagram showing an example of the system of the power supply to the select unit 42 in the electronic apparatus 104 according to the third embodiment. The third power DC3 is supplied from the servers 50 to a line L. A diode D1 for preventing reverse flows is connected between the line L and the servers 50. The third power DC3 is supplied to the select unit 42 via the line L. The second power DC2 having the voltage converted (from 12 V into to 5 V, for example) by the DC-DC converter 48 is supplied to the node between the line L and the select unit 42. The line L is connected to an analog port of a microcomputer 80. With this arrangement, the microcomputer 80 can monitor the voltage of the line L. A switch control signal SW is supplied from a general-purpose port of the microcomputer 80 to the switch 44. Based on the voltage of the line L, the microcomputer 80 outputs the switch control signal SW to the switch 44. For example, when the voltage of the line L becomes lower than a predetermined voltage, the microcomputer 80 supplies the switch control signal SW to the switch 44 so as to turn on the switch 44. The other aspects of this structure are the same as those shown in FIG. 10. The same components as those shown in FIG. 10 are denoted by the same reference numerals as those used in FIG. 10, and explanation of them is not repeated herein. The line L in FIG. 11 is equivalent to the power receiving unit 45 in FIG. 10. Also, the microcomputer 80 is equivalent to the power monitoring unit 46 and the controller 49 in FIG. 10.

As described above, in addition to the second power DC2 as the power supply unique to the electronic apparatus 104, the third power DC3 is supplied to the select unit 42 from the power supplies of the servers 50. In this manner, the power consumption of the electronic apparatus 104 can be reduced.

As in FIG. 9 illustrating the second embodiment, when the received power becomes unstable while being supplied to the select unit 42, the controller 49 supplies the converted power to the select unit 42. In this manner, the power to be supplied to the select unit 42 can be switched to the second power DC2 when the third power DC3 from the servers 50 becomes unstable. Accordingly, power can be stably supplied to the select unit 42.

Figure 12:
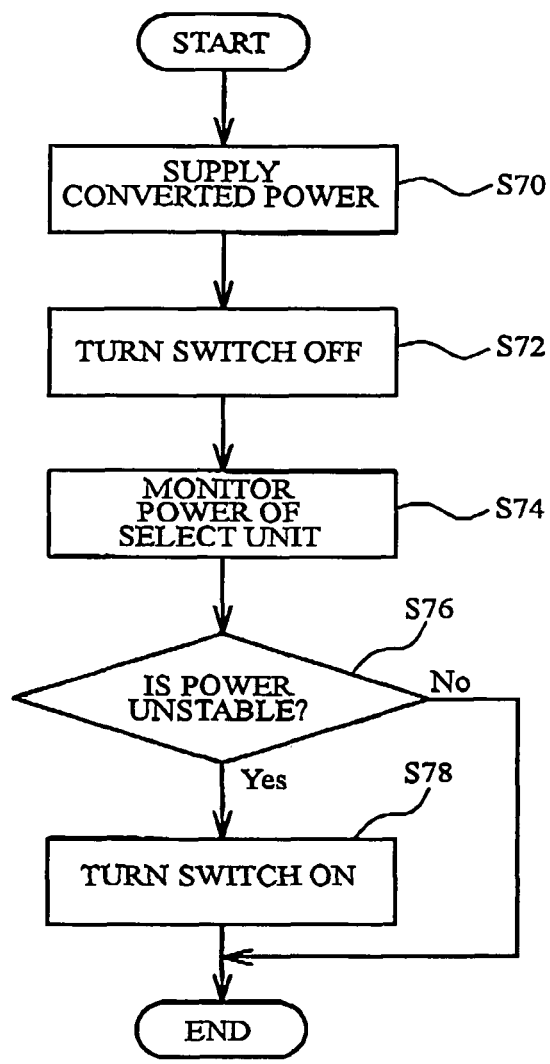
FIG. 12 is a flowchart showing another control operation of the controller.

FIG. 12 is a flowchart showing another control operation of the controller 49. The controller 49 turns on the switch 44, and supplies the second power DC2 (the converted power) to the select unit 42 (step S70). The controller 49 switches the power being supplied to the select unit 42, to the third power DC3 (the received power). That is, the controller 49 turns off the switch 44 (step S72). After a predetermined period of time, the controller 49 receives the check signal CHECK3 from the power monitoring unit 46 (step S74). The controller 49 determines whether the power being supplied to the select unit 42 is unstable (step S76). If the determination result is "No", the operation comes to an end. That is, the supply of the third power DC3 to the select unit 42 is continued. If the determination result is "Yes", the controller 49 turns on the switch 44 (step S78). That is, the power to be supplied to the select unit 42 is switched from the third power DC3 to the second power DC2.

Figure 13A:
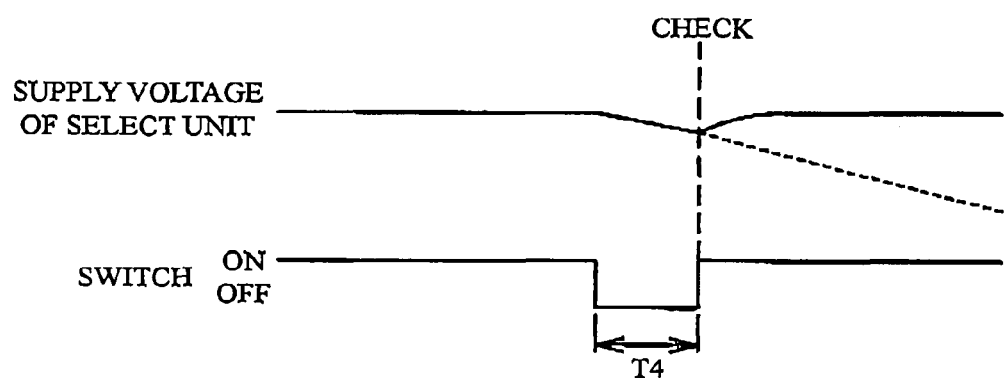
FIGS. 13A and 13B are timing charts showing supply voltages of the select unit and operations of the switch.
Figure 13B:
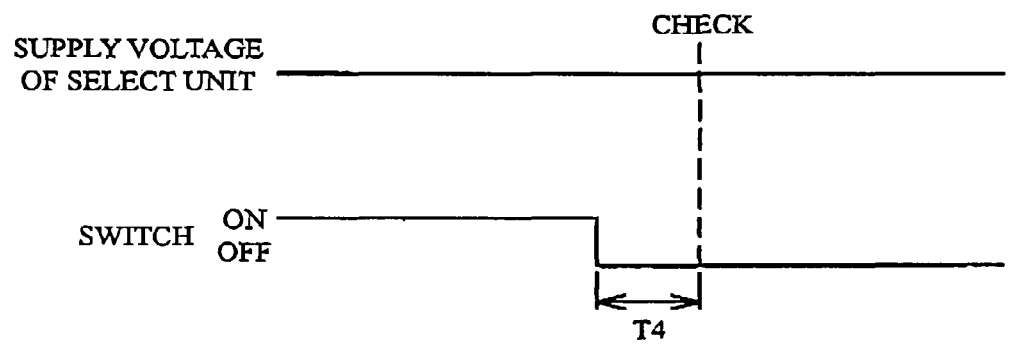

FIGS. 13A and 13B are timing charts showing supply voltages of the select unit 42 and operations of the switch 44. As shown in FIG. 13A, the second power DC2 is supplied to the select unit 42 while the switch 44 is in an ON state. In step S72 of FIG. 12, the switch 44 is turned off. As in step S74 of FIG. 12, after a period of time T4, the controller 49 checks the power supply to the select unit 42. If the power being supplied to the select unit 42 is unstable, or if the power being supplied to the select unit 42 is outside a predetermined range, for example, the controller 49 turns on the switch 44, as in step S78 of FIG. 12. In this manner, the second power DC2 is supplied to the select unit 42.

As shown in FIG. 13B, after the period of time T4 since the switch 44 is turned off, the controller 49 checks the power supply to the select unit 42. If the power being supplied to the select unit 42 is not unstable, the controller 49 maintains the switch 44 in the ON state. Accordingly, the supply of the third power DC3 to the select unit 42 is continued.

According to the third embodiment, as in step S72 of FIG. 12, the controller 49 switches the power being supplied to the select unit 42 from the second power DC2 to the third power DC3. After the predetermined period of time, the controller 49 monitors the state of the power being supplied to the select unit 42, as in step S74. If the power being supplied to the select unit 42 is unstable, the controller 49 switches the power being supplied to the select unit 42 from the third power DC3 to the second power DC2, as in step S78.

As indicated by the dotted line in FIG. 13A, the supply voltage of the select unit 42 becomes lower when the supply of the third power DC3 to the select unit 42 is continued after the power being supplied to the select unit 42 is switched from the second power DC2 to the third power DC3. As in the third embodiment, by monitoring the power supply to the select unit 42 after the period of time T4 since the switch 44 is turned off, the select unit 42 can function in a stable manner, without a decrease in the supply voltage of the select unit 42, as indicated by the solid line.

If the voltage of the power being supplied to the select unit 42 is outside the predetermined range in step S76 of FIG. 12, the controller 49 can switch the power being supplied to the select unit 42 from the third power DC3 to the second power DC2. For example, when the voltage of the power being supplied to the select unit 42 becomes equal to or lower than a predetermined value, the controller 49 can switch the power being supplied to the select unit 42 from the third power DC3 to the second power DC2.

In the third embodiment, after the period of time T4 since the switch 44 is turned off, the controller 49 monitors the power being supplied to the select unit 42. The period of time T4 may be a fixed time, or may be a period that varies with the situation. Also, the operations according to the third embodiment may be applied to the second embodiment.

[Fourth Embodiment]

Figure 14:
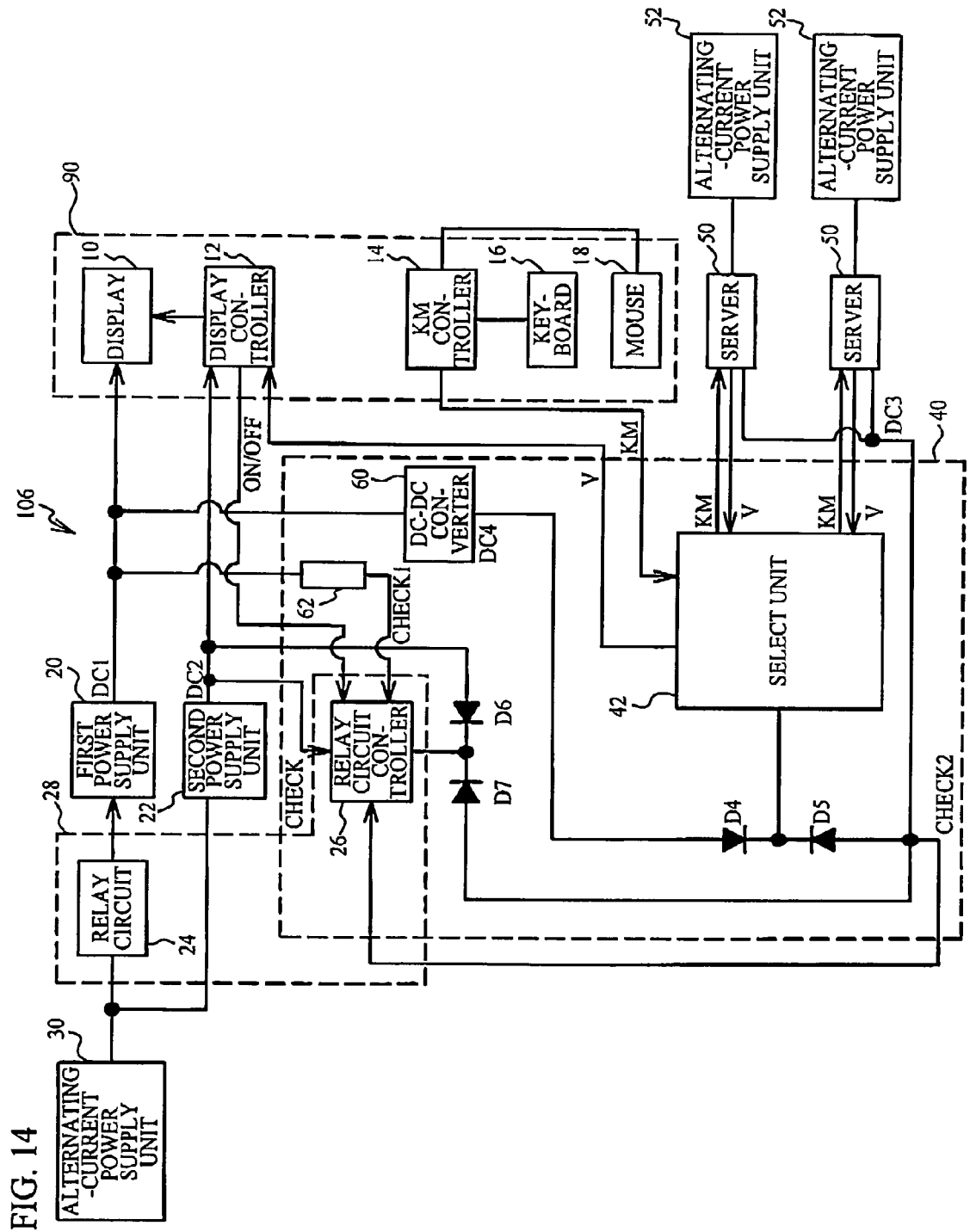
FIG. 14 is a block diagram of an electronic apparatus according to a fourth embodiment.

A fourth embodiment concerns an example case where power is supplied to the KVM switch 40 from the first power supply unit 20. FIG. 14 is a block diagram of an electronic apparatus according to the fourth embodiment. The electronic apparatus 106 includes the main unit 90, the power supply unit 92, and the KVM switch 40. The main unit 90 includes the display 10, the display controller 12, the keyboard 16, the mouse 18, and the KM controller 14. The functions of the respective components are the same as those of the first embodiment and the second embodiment, and therefore, explanation of them is not repeated herein.

The KVM switch 40 includes the select unit 42. The power supply unit 92 includes the first power supply unit 20, the second power supply unit 22, and the shutoff unit 28. The KVM switch 40 includes the select unit 42 and a DC-DC converter 60. Servers 50 are connected to the KVM switch 40. The relay circuit controller 26 is shared between the shutoff unit 28 and the KVM switch 40. The relay circuit controller 26 monitors the first power DC1 output from the first power supply unit 20, using a check signal CHECK1. The relay circuit controller 26 also monitors the second power DC2 output from the second power supply unit 22, using the check signal CHECK. The relay circuit controller 26 further monitors the third power DC3 supplied from the servers 50, using the check signal CHECK2. Based on the results (for example, voltages) of monitoring of the first power DC1, the second power DC2, and the third power DC3, the relay circuit controller 26 controls the relay circuit 24. Based on the ON/OFF signal output from the display controller 12, the relay circuit controller 26 controls the relay circuit 24. The functions of the select unit 42 are the same as those of the second embodiment, and therefore, explanation of them is not repeated herein.

Part of the first power DC1 output from the first power supply unit 20 is converted into a fourth power DC4 having a fourth voltage by the DC-DC converter 60. The fourth voltage DC4 is a 5-V direct current, for example, and may be the same as the voltage of the second power DC2, for example. Alternatively, the fourth voltage DC4 may be the same as the voltage of the third power DC3 supplied from the servers 50. The fourth power DC4 supplied from the DC-DC converter 60 is supplied to the select unit 42 via a forward diode D4. Part of the third power DC3 supplied from the servers 50 is supplied to the select unit 42 via a forward diode D5. The diodes D4 and D5 are reverse-flow preventing diodes.

Part of the second power DC2 output from the second power supply unit 22 is supplied to the relay circuit controller 26 via a forward diode D6. Part of the third power DC3 supplied from the servers 50 is supplied to the relay circuit controller 26 via a forward diode D7. The diodes D6 and D7 are reverse-flow preventing diodes. It should be noted that the second power DC2 and the third power DC3 may be supplied to the relay circuit 24. The first power DC1 is monitored by the relay circuit controller 26 through a photo coupler 62.

In this manner, in the fourth embodiment, the first power DC1 is supplied to the display 10 and the select unit 42. The second power DC2 is supplied to the display controller 12 and the relay circuit controller 26. The third power DC3 from the servers 50 is supplied to the select unit 42 and the relay circuit controller 26.

Figure 15:
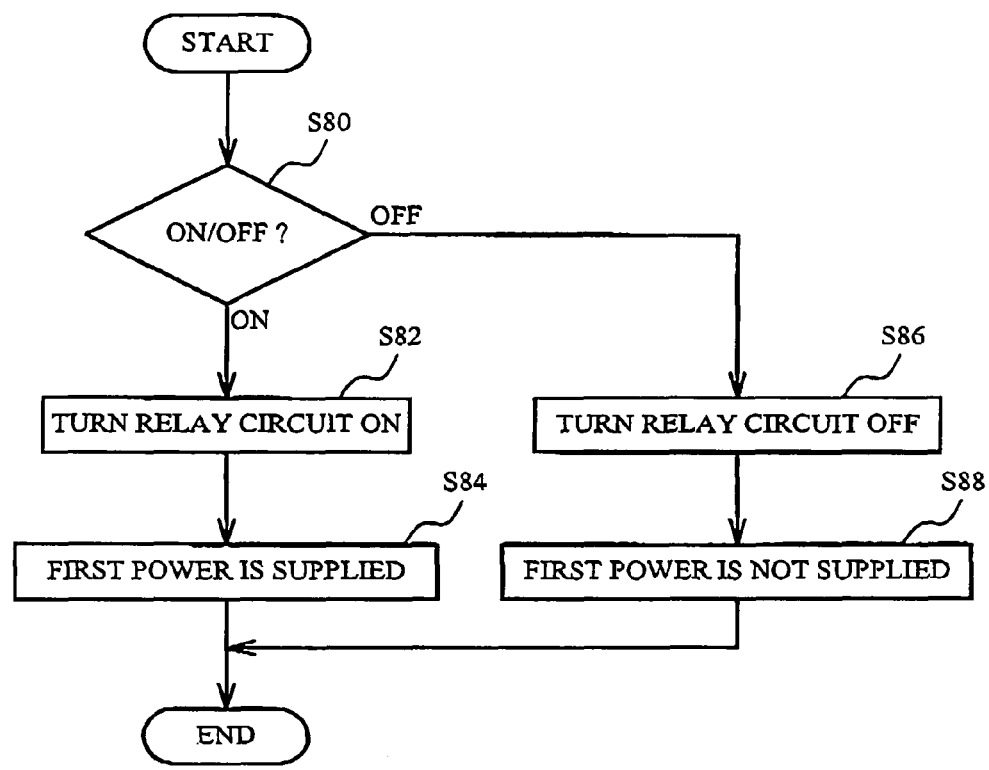
FIG. 15 is a flowchart showing an operation of the relay circuit controller.

FIG. 15 is a flowchart showing an operation of the relay circuit controller 26. As shown in FIG. 15, the relay circuit controller 26 determines whether the ON/OFF signal from the display controller 12 is ON or OFF (step S80). If the ON/OFF signal is ON, the display controller 12 has received an image signal. For example, the power switch of the main unit 90 is on. In that case, the relay circuit controller 26 turns on the relay circuit 24 (step S82). The alternating-current power AC is then supplied to the first power supply unit 20. The first power supply unit 20 converts the alternating-current power AC into the first power DC1 (a 12-V direct current, for example). The first power DC1 is then supplied to the display 10. The first power DC1 is further converted into the fourth power DC4 (a 5-V direct current, for example), and is supplied to the select unit 42 (step S84).

If the ON/OFF signal is OFF in step S80, on the other hand, the display controller 12 has not received an image signal. For example, the electronic apparatus 106 is in a power-off mode or a standby mode. Alternatively, the main unit 90 is in a sleep mode. In that case, the relay circuit controller 26 turns off the relay circuit 24 (step S86). With this arrangement, the alternating-current power AC is not supplied to the first power supply unit 20. Accordingly, the first power DC1 is not supplied to the display 10 and the select unit 42 (step S88).

In step S84, even if the fourth power DC4 is not supplied to the select unit 42, the third power DC3 may be supplied to the select unit 42, as long as the servers 50 are able to supply the third power DC3 to the select unit 42.

According to the fourth embodiment, the first power supply unit 20 supplies the first power DC1 converted into the fourth power DC4 to the select unit 42, and the second power supply unit 22 does not supply power to the select unit 42, as shown in FIG. 14. Accordingly, when the ON/OFF signal is OFF, or when the electronic apparatus 106 is in a power-off mode, a standby-mode, or a sleep mode, power is not supplied to the display 10 and the select unit 42, as shown in FIG. 15. In that case, only the second power DC2 is supplied to the shutoff unit 28 and the display controller 12. With this arrangement, the power consumption of the electronic apparatus 106 in the power-off mode, the standby mode, or the sleep mode can be reduced.

Also, a power converter (the DC-DC converter 60, for example) converts the first power DC1 into the fourth power DC4 having the fourth voltage, and supplies the fourth power DC4 to the select unit 42. Accordingly, even in a case where the voltage of the display 10 differs from the voltage of the select unit 42 (where the supply voltage of the display 10 is 12 V while the supply voltage of the select unit 42 is 5 V, for example), a power having an appropriate voltage can be supplied to the select unit 42. It should be noted that the power converter may not be prepared, and the first power DC1 may be supplied directly to the select unit 42.

The display 10 tends to cause noise in the power supplies. Therefore, the power converter may be an insulator-type DC-DC converter. With this arrangement, the select unit 42 is not affected by noise caused by the display 10. The relay circuit controller 26 in the shutoff unit 28 can monitor the first power DC1 through the photo coupler 62. Accordingly, the shutoff unit 28 (particularly, the relay circuit controller 26) is not affected by noise caused by the display 10.

According to the first embodiment, the sleep-mode power and the power-off/standby mode power can be reduced. Meanwhile, according to the third embodiment, the power-on mode power can be reduced. Accordingly, an electronic apparatus compliant with the International Energy Star standard, for example, can be provided. Further, according to the fourth embodiment, the sleep-mode power and the power-off/standby mode power in the electronic apparatus containing the KVM switch as in the second embodiment can be reduced.

Figure 16A:
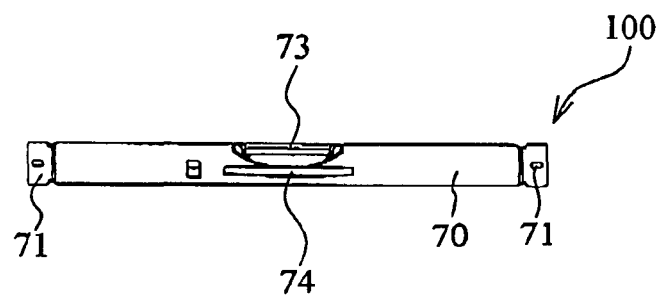
FIGS. 16A and 16B are diagrams showing an example exterior according to the first through fourth embodiments.
Figure 16B:
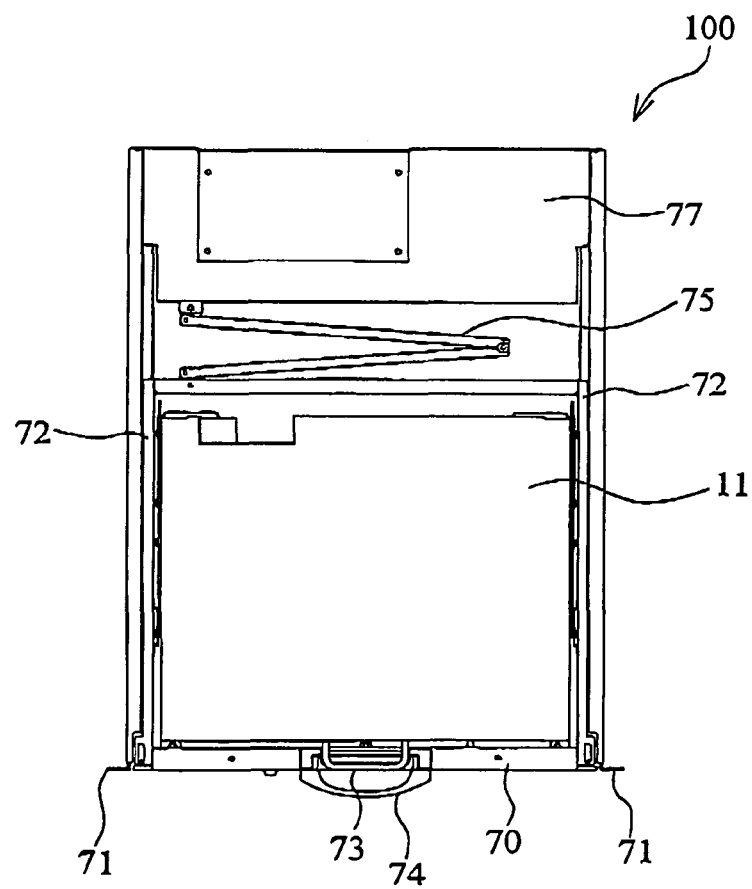
Figure 17A:
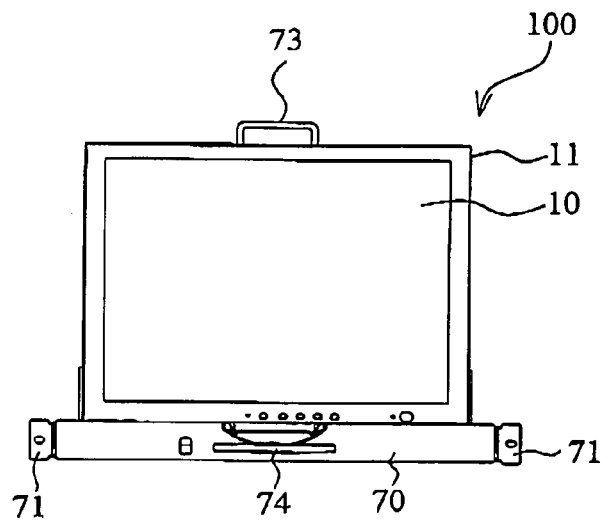
FIGS. 17A through 17C are diagrams also showing the example exterior according to the first through fourth embodiments.
Figure 17B:
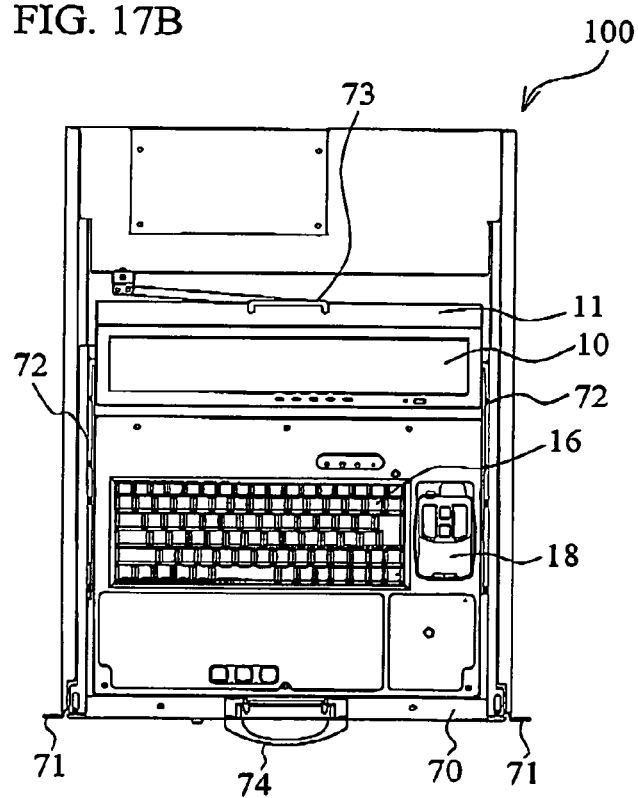
Figure 17C:
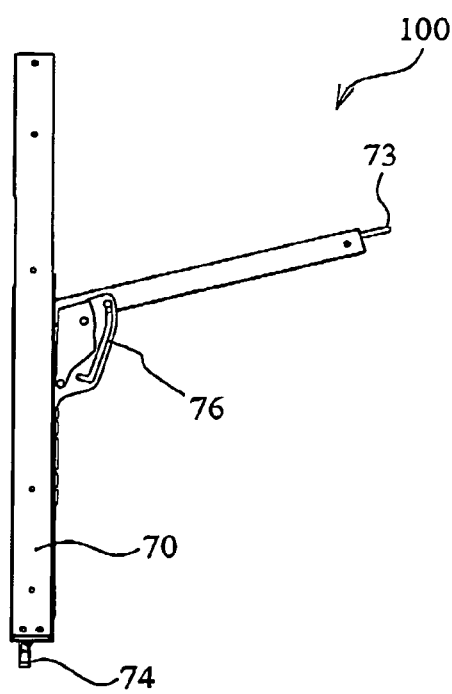

FIGS. 16A through 17C show an example exterior of the first through fourth embodiments, and mainly show an example exterior of the drawer-type electronic apparatus 100 of the first embodiment. FIGS. 16A and 16B are a front view and a plan view of the electronic apparatus 100, with the display device 11 being closed. FIGS. 17A, 17B, and 17C are a front view, a plan view, and a side view of the electronic apparatus 100, with the display device 11 being open.

As shown in FIGS. 16A and 16B, the keyboard 16 and the mouse 18 of the electronic apparatus 100 are housed in a housing 70. Guide members 72 are formed on both sides of the housing 70. An attachment part 71 is placed on the front side of each of the guide members 72. The electronic apparatus 100 is detachably attached to a rack by the attachment parts 71. Information processing devices such as the servers 50 can also be attached to the rack. After the housing 70 is attached to the rack, the housing 70 is supported by the guide members 72 in such a manner that the housing 70 can be moved forward and backward. A drawer handle 74 is attached to the front face of the housing 70. When the drawer handle 74 is pulled forward, the housing 70 can be pulled out of the rack. The back face of the housing 70 and a rear portion 77 are connected by a pantograph-type link portion 75 that can expand and contract. At least part of the main unit 90, the power supply unit 92, and the KVM switch 40 may be positioned in the rear portion 77. The drawer handle 73 is the handle for the display device 11.

As shown in FIGS. 17A through 17C, guide members 76 for rotating and opening the display device 11 are provided. As the display device 11 is opened, the display 10 can be viewed from the front. Also, the keyboard 16 and the mouse 18 in the housing 70 can be used. With the housing 70 being attached to the rack, for example, the housing 70 is pulled forward to open the display device 11.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic apparatus comprising:
a display;
a display controller that displays an image on the display in accordance with an image signal input;
a first power supply unit that coverts an alternating-current power into a first power having a first voltage, and supplies the first power to the display;
a shutoff unit that shuts off the alternating-current power being supplied to the first power supply unit, based on the image signal; and
a second power supply unit that converts the alternating-current power into a second power having a second voltage and supplies the second power to the display controller and the shutoff unit,
wherein the shutoff unit includes a relay circuit and a relay circuit controller, and when the relay circuit controller transmits a set signal to the relay circuit, the relay circuit supplies the alternating-current power to the first power supply unit, and when the relay circuit controller transmits a reset signal to the relay circuit, the relay circuit shuts off the alternating-current power being supplied to the first power supply unit, and wherein the relay circuit controller monitors an output of the first power supply unit, and when the first power is not output from the first power supply unit though the set signal has been transmitted to the relay circuit, the relay circuit controller transmits the set signal to the relay circuit, and when the first power is output from the first power supply unit though the reset signal has been transmitted to the relay circuit, the relay circuit controller transmits the reset signal to the relay circuit.

2. The electronic apparatus as claimed in claim 1, wherein, when the display controller is unable to receive the image signal, the shutoff unit shuts off the alternating-current power.

3. The electronic apparatus as claimed in claim 2, wherein an alternating-current power is supplied to the second power supply unit, regardless of the image signal.

4. The electronic apparatus as claimed in claim 1, wherein, when transmitting the set signal to the relay circuit, the relay circuit controller transmits the set signal regularly or irregularly, and when transmitting the reset signal to the relay circuit, the relay circuit controller transmits the reset signal regularly or irregularly.

5. The electronic apparatus as claimed in claim 1, wherein the electronic apparatus is a drawer-type electronic apparatus.

6. An electronic apparatus comprising:
a select unit that selects a server from a plurality of servers and transmits an image signal received from the selected server to a display device;
a first power supply unit that converts an alternating-current power into a converted power;
a power receiving unit that receives a received power from at least one of the servers; and
a controller that selects one of the converted power and the received power, and supplies the selected one of the converted power and the received power to the select unit.

7. The electronic apparatus as claimed in claim 6, wherein, when the received power becomes unstable while the received power is being supplied to the select unit, the controller supplies the converted power to the select unit.

8. The electronic apparatus as claimed in claim 6, wherein the controller monitors a state of power being supplied to the select unit after a predetermined period of time since the power being supplied to the select unit is switched from the converted power to the received power, and, when the power being supplied to the select unit is unstable, switches the power being supplied to the select unit from the received power to the converted power.

9. The electronic apparatus as claimed in claim 8, wherein, when a voltage of the power being supplied to the select unit is outside a predetermined range, the controller switches the power being supplied to the select unit from the received power to the converted power.

10. The electronic apparatus as claimed in claim 6, wherein the controller selects the first power supply unit to supply the converted power to the select unit when the received power becomes unstable.

11. The electronic apparatus as claimed in claim 10, comprising:
a display controller that displays an image on the display device in accordance with an image signal input;
a second power supply unit that converts an alternating-current power into another power, and supplies the another power to the display device; and
a shutoff unit that shuts off the alternating-current power being supplied to the second power supply unit, based on the image signal,
wherein the first power supply unit supplies the converted power to the display controller and the shutoff unit.

12. An electronic apparatus comprising:
a display;
a display controller that displays an image on the display in accordance with an image signal input;
a first power supply unit that coverts an alternating-current power into a first power having a first voltage, and supplies the first power to the display;
a shutoff unit that shuts off the alternating-current power being supplied to the first power supply unit, based on the image signal; and
a second power supply unit that converts the alternating-current power into a second power having a second voltage and supplies the second power to the display controller and the shutoff unit; and
a select unit that selects a server from a plurality of servers, and transmits an image signal to the display controller, the image signal being output from the selected server,
wherein the first power supply unit supplies the first power to the select unit, and the second power supply unit does not supply power to the select unit.

13. The electronic apparatus as claimed in claim 12, further comprising
a power converter that converts the first power into a fourth power having a fourth voltage, and supplies the fourth voltage to the select unit.

14. The electronic apparatus as claimed in claim 13, wherein the power converter is an insulator-type DC-DC converter.

15. The electronic apparatus as claimed in claim 12, wherein the shutoff unit monitors the first power through a photo coupler.

* * * * *